(12) United States Patent
Lerner et al.

(10) Patent No.: US 7,310,186 B2
(45) Date of Patent: Dec. 18, 2007

(54) UNIFORM MULTIPLE LIGHT SOURCE ETENDUE

(75) Inventors: Scott A. Lerner, Corvallis, OR (US); Anurag Gupta, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 204 days.

(21) Appl. No.: 11/255,473

(22) Filed: Oct. 21, 2005

(65) Prior Publication Data

US 2007/0091600 A1     Apr. 26, 2007

(51) Int. Cl.
*G02B 27/30* (2006.01)
*F21V 5/00* (2006.01)

(52) U.S. Cl. .................... 359/641; 362/244

(58) Field of Classification Search ............... 359/641, 359/618, 625–626, 629, 636, 639
See application file for complete search history.

(56) References Cited

U.S. PATENT DOCUMENTS

| | | | |
|---|---|---|---|
| 5,333,077 A | 7/1994 | Legar et al. | |
| 5,369,659 A | 11/1994 | Furumoto et al. | |
| 5,521,748 A | 5/1996 | Sarraf | |
| 5,923,475 A * | 7/1999 | Kurtz et al. | 359/619 |
| 6,005,717 A | 12/1999 | Neuberger et al. | |
| 6,064,528 A | 5/2000 | Simpson, Jr. | |
| 6,353,502 B1 | 3/2002 | Marchant et al. | |
| 6,400,513 B1 | 6/2002 | Southwell | |
| 6,433,934 B1 | 8/2002 | Reznichenko et al. | |
| 6,577,429 B1 | 6/2003 | Kurtz et al. | |
| 6,717,362 B1 | 4/2004 | Lee et al. | |
| 6,771,426 B2 * | 8/2004 | Yamamoto et al. | 359/641 |
| 2002/0126479 A1 * | 9/2002 | Zhai et al. | 362/244 |
| 2004/0114250 A1 | 6/2004 | Kato | |
| 2004/0174604 A1 | 9/2004 | Brown | |
| 2006/0262408 A1 * | 11/2006 | Kato | 359/618 |
| 2006/0274287 A1 * | 12/2006 | Heeman et al. | 353/94 |

FOREIGN PATENT DOCUMENTS

WO     WO 00/45443 A     8/2000

OTHER PUBLICATIONS

Fresnel, Augustin-Jean, Fresnel Lens, Encyclopedia.LaborlawTalk.com, printed from internet Jun. 17, 2005 (2 pgs.).

* cited by examiner

*Primary Examiner*—Scott J. Sugarman
*Assistant Examiner*—DaWayne A Pinkney

(57) ABSTRACT

A method and apparatus emits light from multiple light sources and combines the etendue of the light sources such that the etendue is substantially uniformly distributed over an area.

22 Claims, 6 Drawing Sheets

UNIFORM MULTIPLE LIGHT SOURCE ETENDUE

BACKGROUND

Illumination systems, such as projectors, may sometimes utilize multiple light sources. Because such light sources are typically contained in packages that are larger than the physical extent of the source, the light from such sources is spread over a large area and etendue of the light sources has a non-uniform distribution. As a result, the total number of lumens that are actually used by the projector is less than the total number of lumens from all of the light sources.

DETAILED DESCRIPTION OF EXAMPLE EMBODIMENTS

Figure 1:
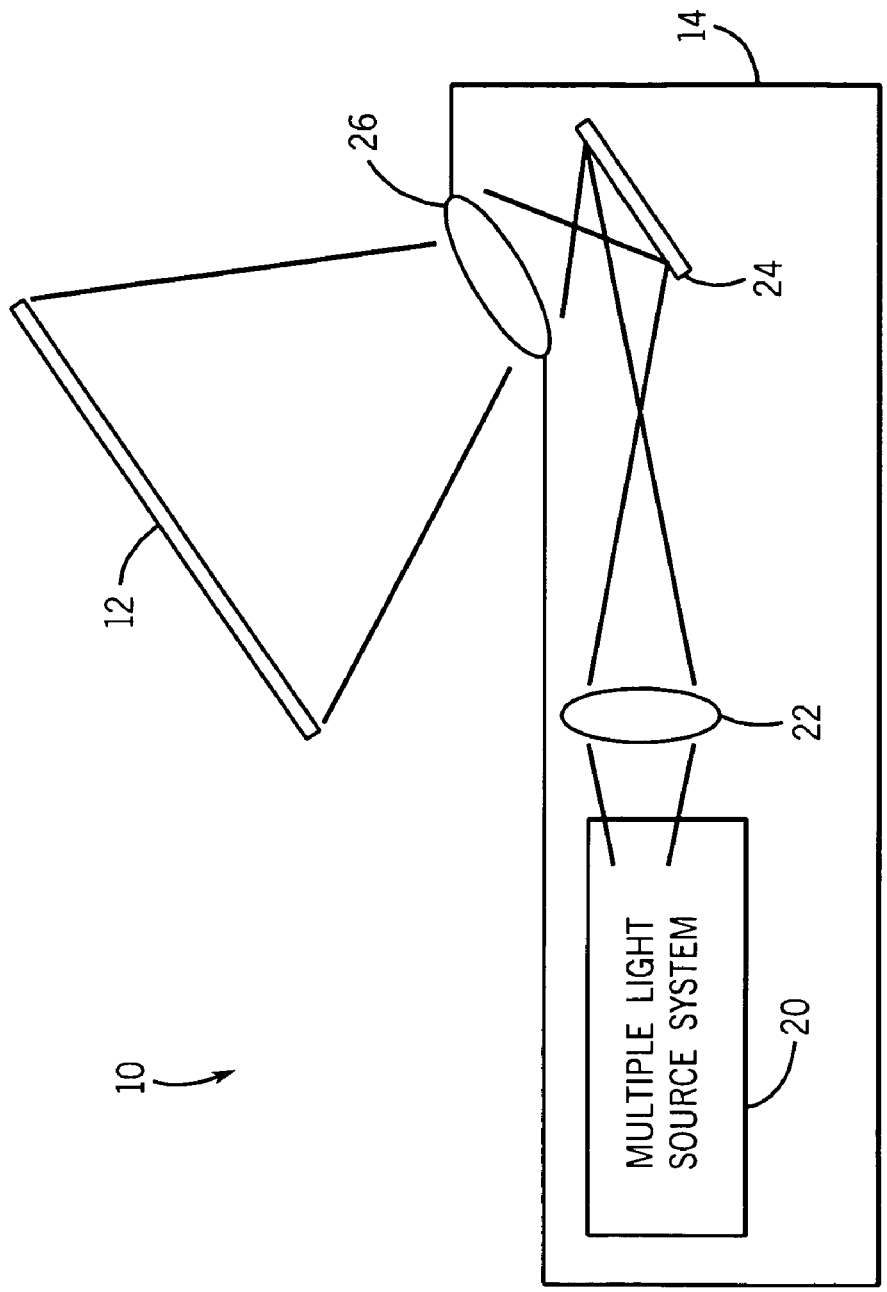
FIG. 1 is a schematic illustration of one example of a projection system according to an example embodiment.

FIG. 1 schematically illustrates one example embodiment of a projection system 10. Projection system 10 generally includes screen 12 and projector 14. Screen 12 constitutes a structure configured to reflect light projected upon it by projector 14. In one embodiment, screen 12 may be passive in that screen 12 has a predetermined reflectivity. In other embodiments, screen 12 may be active having one or more portions that may have selectively adjustable reflectivities.

Projector 14 constitutes a device configured to project light upon screen 12. Projector 14 generally includes multiple light source system 20, condenser 22, optical modulator 24 and projection lens 26. Multiple light source system 20 supplies light for ultimate projection upon screen 12. Multiple light source system 20, schematically shown, is configured to provide light from a multitude of distinct light sources and to combine the light such that the etendue of the light sources is at least substantially uniformly distributed over an area. In the particular embodiment illustrated, multiple light source system 20 is further configured to scale or reduce a size of the area for use by light engine architectures employing an optical modulator 24.

Condenser 22 constitutes one or more optical devices, such as lenses, configured to image light from system 20 onto optical modulator 24. In one embodiment, condenser 22 may include one or more refractive or reflective components. Multiple light source system 20 and condenser 22, together, serve as an illumination system for optical modulator 24.

Optical modulator 24 selectively modulates light imaged upon it so as to form an image of light that is projected to screen 12 by lens 26. Although optical modulator 24 is illustrated as being reflective, in other embodiments, optical modulator 24 may be transmissive. Examples of optical modulator 24 include digital micro mirror devices (DMDs), liquid crystal devices (LCDs), liquid crystal on silicon (LCos) devices or Fabry-Perot interferometric devices. In particular embodiments, projector 14 may include greater than one optical modulator.

Projection lens 26 images light from the one or more optical modulators 24 onto screen 12. Projection lens 26 may include one or more refractive or reflective components.

Overall, because multiple light source system 20 of projector 14 provides light from a multitude of distinct light sources, projector 14 may provide brighter light with lower complexity and cost. Because multiple light source system 20 combines light from the multiple light sources such that the etendue of the light sources is uniformly distributed over an area that is imaged upon optical modulator 24 by condenser 22, more efficient coupling of light between the source system 20 and the optical modulator 24 may be achieved. As a result, images projected upon screen 12 may have an improved brightness.

Light source system 20 efficiently uses the light from light sources to illuminate the optical modulator. In general, it may be very difficult to couple efficiently the light from multiple light sources together. The concept of etendue may facilitate determining how many light sources can be combined together in an efficient manner for a given application.

The etendue of a light source is generally defined by $$E = \iint_{A,\Omega} dA \, d\Omega,$$

wherein dA denotes the projected differential area of a light beam and dΩ denotes the differential solid angle of the light beam emanating from the differential area dA. Etendue is conserved in any non-absorbing optical system. However, the distribution of etendue is not conserved and it generally spreads over a larger spatial-angular region as the light propagates in an optical system. To be able to couple the light from the source to the target efficiently, the etendue of the source as compared to the etendue at the target should be as small as possible. When the etendue of the source is less than or equal to the etendue at the target, it is physically possible to achieve 100% efficiency in the absence of absorption. However, it may not always be practical as the optical system design may get too complex and/or expensive to implement. To minimize the complexity and cost, the spread in the spatial distribution of etendue should be minimized. Multiple light source system 20 provides a scheme to minimize the spread in the spatial distribution of etendue while combining multiple light sources.

Figure 2:
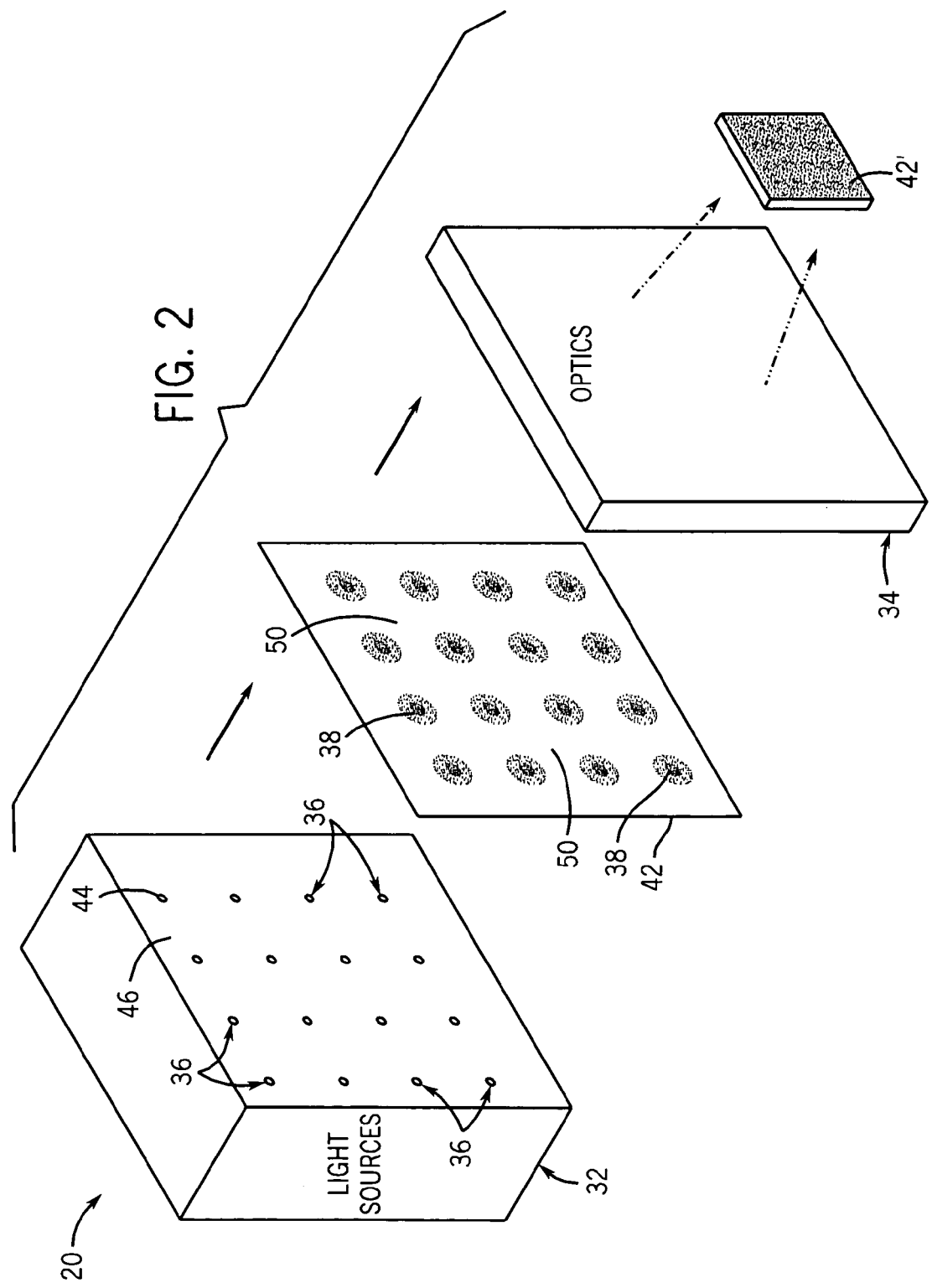
FIG. 2 is a top perspective view/schematically illustrating one example of a multiple light source system of the projection system of FIG. 1 according to an example embodiment.

FIG. 2 schematically illustrates multiple light source system 20 in further detail. Multiple light source system 20 generally includes array 32 of light sources 36 and optics 34. Array 12 constitutes a two-dimensional array of light sources 36 (schematically shown) configured to emit light towards optics 34. Examples of light sources 36 include light emitting diodes, fluorescent bulbs, incandescent bulbs, arc lamps, lasers or various other light emitting elements. Although array 32 is illustrated as a two-dimensional array of sixteen light sources 36, in other embodiments, array 32 may constitute an array of greater or fewer number of such light sources having multiple relative positionings and/or patterns.

As shown by FIG. 2, each light source 36 has a light distribution 38 (schematically illustrated by points). The light distribution 38 from light sources 36 is spatially non-uniform over a plane or area 42 located proximate to light sources 36. As a result, the etendue of the light distribution is also non-uniform. In particular, there are holes in the far field angular spectrum of the etendue. The concept of etendue is helpful in determining how many light sources can be combined together in an efficient manner for a given application. Etendue is always conserved in any non-absorbing optical system. However, the distribution of etendue is not conserved and it generally spreads over a larger spatial-angular region as the light propagates in an optical system. To be able to couple the light from the source to the target efficiently, it is necessary that the etendue of the source as compared to the target is as small as possible. When the etendue of the source is less than or equal to the etendue of the target, it is physically possible to achieve 100% efficiency in the absence of absorption. However, it may not always be practical as the optical system design may get too complex and/or expensive to implement. To minimize the complexity and cost, it is beneficial to minimize the spread in the spatial distribution of etendue. Optics 34 minimizes the spread in the spatial distribution of etendue while combining multiple light sources.

As further shown by FIG. 2, each of light sources 36 includes an emitter 44 and a surrounding die, base or other structure 46 supporting emitters 44. Due to the space requirements of the structure 46 supporting emitters 44, emitters 44 are spaced from one another when combined. As a result, etendue 18 from light sources 36, proximate to light sources 36, is also spaced so as to leave holes or gaps 50 in the combined light beam pattern spread across area 42. As a result, the net etendue of light sources 36 is spread over a larger angular and spatial region. This larger region over which individual etendue of individual light sources 36 are spread has a reduced efficiency in coupling the light to a desired target while using regular condenser optics.

Optics 34 constitute one or more optical devices arranged and configured so as to collect light from a multitude of light sources 36 and to combine the light such that the distribution of etendue is uniform both in angular and spatial spaces. In one embodiment, optics 34 is further configured to homogenize such light as well as to scale it to a size that may be used as part of an illumination system. In particular, as shown by FIG. 2, optics 34 collects and combines light from light sources 36. In one embodiment, optics 34 further homogenizes and scales such light from light sources 36 so as to provide area 42' of light. Area 42' has a uniform distribution of light across a smaller area as compared to area 42 while having a more uniform etendue distribution.

Because the light is spatially uniformly distributed over the area 42' and has a minimized spread of etendue, system 20 is well suited for illuminating light modulators and other similar devices. Because system 20, in one embodiment, is further configured to scale or reduce the size of the area of light, system 20 is also well suited for existing light engine architectures using a variety of illuminating reflective light modulators such as DMD light modulators and Fabry-Perot interferometric light modulators.

In one embodiment, optics 24 include one or more optical elements configured to collimate light from light sources 36, bring together the collimated beams from various light sources as much closer as possible to the neighboring light sources, merge, homogenize and scale the light. In particular embodiments, such collimation may be performed by collimation lenses such as reflective collimation lenses or refractive collimation lenses. Such refractive collimation lenses may be spherical or aspherical and may be formed from plastic, glass or gradient index materials. Homogenization or merging of the light may be performed using imaging or non-imaging components. In one particular embodiment, optics 34 may additionally include a field lens configured to prevent the collimated beam walk-off.

In the particular embodiment in which optics 34 additionally is configured to scale or reduce in size the area of light, optics 34 may additionally include a tapered integrating tunnel or rod. In such an embodiment, the integrating light tunnel may additionally serve to homogenize the light.

Figure 3:
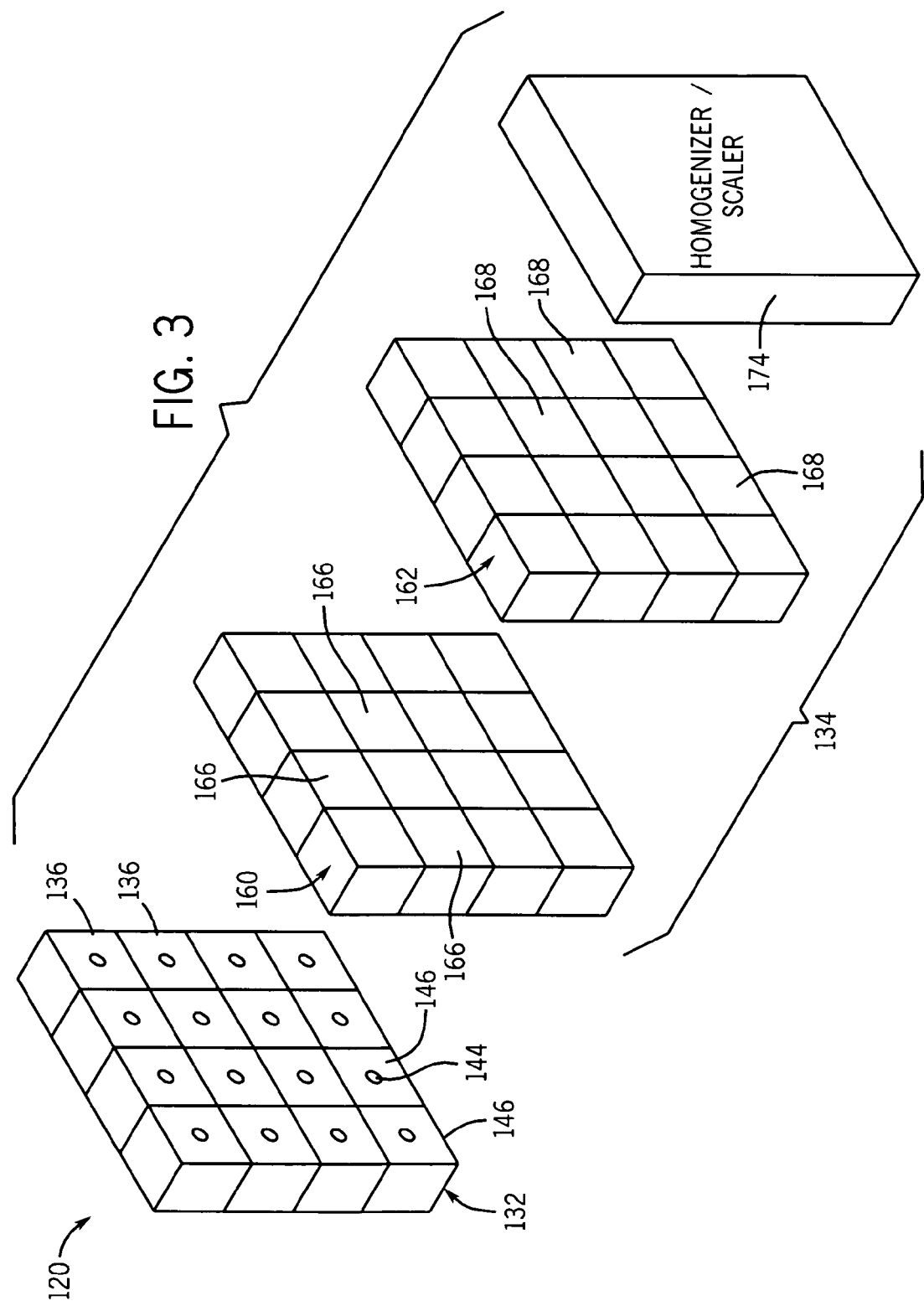
FIG. 3 is a top perspective view of another embodiment of the multiple light source system of FIG. 2 according to an example embodiment.
Figure 4:
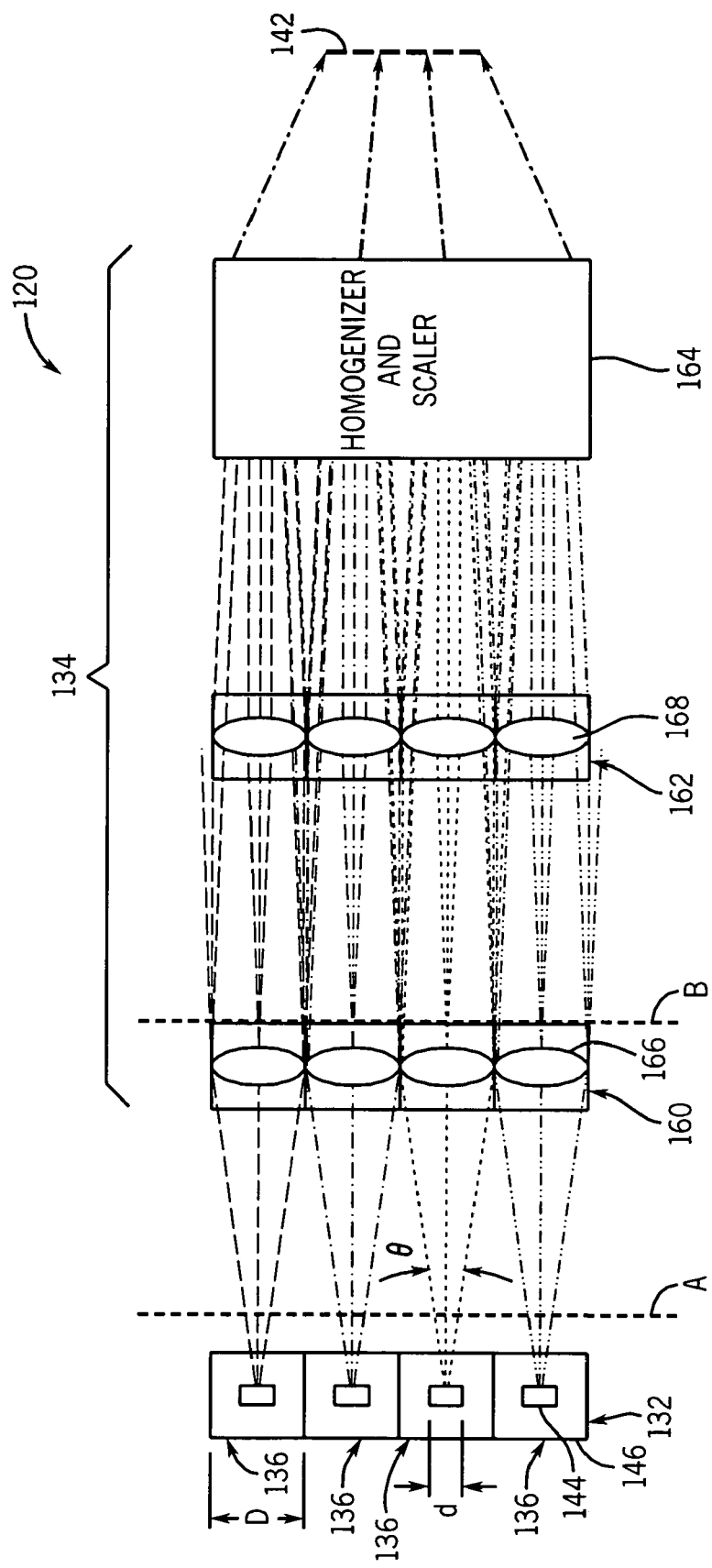
FIG. 4 is a sectional view of the multiple light source system of FIG. 3 according to an example embodiment.

FIGS. 3 and 4 illustrate multiple light source system 120, one example embodiment of illumination system 20 shown and described with respect to FIG. 1. Multiple light source system 120 includes array 132 of light sources 136 and optics 134. Array 132 constitutes a two-dimensional array of light sources 136. Each source 136 includes an individual light emitter 144 and a supporting package or base structure 146. Light emitter 144 constitutes a source of light such as a light emitting diode or die, a fluorescent bulb or tube, an incandescent bulb or any other component configured to generate and emit light.

Base structure 146 constitutes one or more structures configured to support light emitter 144. In one embodiment, base structure 146 may constitute a substrate that supports a light emitter, such as a light emitting diode. In another embodiment, base structure 146 may include a socket or other means for providing power to light emitter 132. Although base structures 146 of each of sources 136 are illustrated as being substantially identical in size and configuration, in other embodiments, base structures 146 may be sized and shaped differently from one another and may support different light emitters 144.

Because base structure 144 has a much larger physical size as compared to light emitter 144, the combined light from individual light emitters 144 has holes in the far field etendue spectrum. As a result the effective etendue of the system for practical purposes is increased resulting in reduction in the average effective luminance or brightness. As noted above, the etendue of the individual light emitters 144 are non-uniformly distributed over an area such as area 42 (shown in FIG. 2). Optics 134 combines the etendue of the individual light sources 132 such that the etendue of light sources 132 is uniformly distributed over a subsequent area of light such as area 42' (shown in FIG. 2).

In the particular embodiment illustrated, optics 134 includes array 160 of collimation lenses 166, array 162 of field lenses 168 and a homogenizer/scaler 174. Array 160 constitutes a two-dimensional array of individual lenses 166. Individual lenses 166 are each configured to be fully illuminated by light from a corresponding one of light sources 132. Each lens 166 is further configured to substantially collimate light independently (quasi-collimated) from its respective light source. Each lens 166 has a shape and size substantially equal to a shape and size of a corresponding base structure 146 of the corresponding light source 136. As a result, collimation lenses 166 combine the etendue of each of light sources 136 such that the average etendue of each light source 136 is uniformly distributed over the area of light emitted from array 160. Array 160 of lenses 166 eliminates or substantially reduces holes or gaps in the spatial-angular distribution of light.

As further shown by FIG. 4, collimation lenses 160 are used to uniformize etendue, reduce the spread in the etendue spectrum and thereby increase the coupling of light from multiple light sources 136 onto a desired target using conventional or existing optical architectures. For example, in one embodiment in which all emitters 144 are circular and all base structures are of the same type of geometric configuration, the etendue at plane A may be defined as $N (\pi d^2/4)\Omega_1$, where:

$N$=the number of light sources;

$\Omega_1$=The solid angle of emission from each source at plane A;

d is the size or diameter of an individual emitter; and where the numerical aperture of each source 132 at plane A is sin θ.

Moreover, the effective/apparent etendue (practical for implementation) at plane A may be defined $N(\pi D^2/4)\Omega_1$, where D is equal to the size or diameter of the package or base structure.

At plane B, the actual and effective/apparent etendue may be defined as $N(\pi D^2/4)\Omega_2$, where the solid angle of emission at plane B is assumed to be $\Omega_2$. Since d<D the etendue at plane B is less than apparent etendue at plane A. However, since $\Omega_2$ is equal to $\Omega_1 (d^2/D^2)$, the etendue at plane B is substantially equal to the actual etendue at plane A. Thus, system 120 ensures that the effective etendue is the same as the actual etendue by minimizing the spread in the etendue spectrum.

Array 162 constitutes an array of individual field lenses 168 opposite to corresponding lenses 166 of collimating lenses 166. In the particular example illustrated, each individual field lens 168 has a size and shape substantially equal to the size and shape of a corresponding one of light sources 136 and one of lenses 166. Field lenses 168 are weak in power and image the plane B onto an appropriate entrance or collection pupil or light collection aperture of the rest of the system 120. The field lenses 168 prevent beam walk-off (i.e., the spread of light beyond bounds of a collection aperture) since light entering lenses 138 is substantially collimated due to a finite spatial extent of each source 136 as the light from plane B is imaged by the system at the optical modulator. Although the sets of corresponding base structures 146, lenses 166 and lenses 168 are illustrated as all being square in shape, in other embodiments, such sets may have different shapes and may be different from one another. For example, base structures 146, lenses 166 and lenses 168 of one set may have a first shape while those of another set have another shape.

Scaler/homogenizer 164 constitutes one or more devices configured to homogenize or merge light from field lenses 168. In the particular embodiment illustrated, scaler/homogenizer 164 is also configured to scale or reduce the size of the integrated light to a reduced area 142. Because scaler/homogenizer 164 reduces the area of light, multiple light source system 120 is well suited for use as a source for existing light engine architectures using a variety of spatial light modulators. In other embodiments, scaler/homogenizer 164 may alternatively be configured so as to not reduce the size of area of light provided by system 120.

Figure 5:
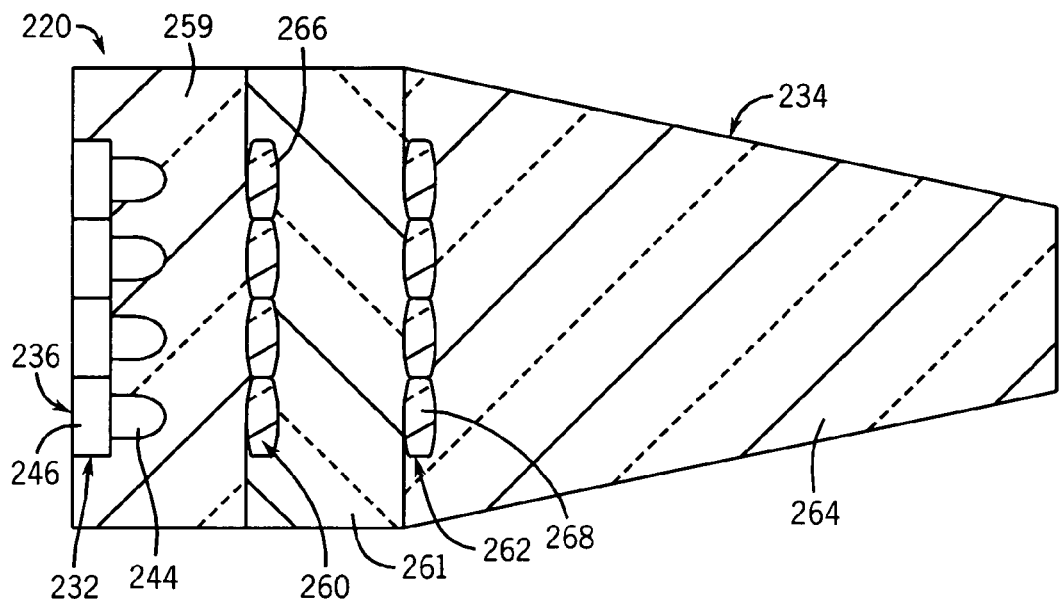
FIG. 5 is a sectional view of another embodiment of the multiple light source system of FIG. 4 according to an example embodiment.

FIG. 5 illustrates multiple light source system 220, one embodiment of source system 20 in FIG. 1. System 220 generally includes light source array 232 and optics 234. Light source array 232 constitutes a two-dimensional array of light sources 236. Each source 236 includes an individual light emitter 244 supported by a base structure 246. In the particular example illustrated, each emitter 244 constitutes a light emitting diode die. Each light source 236 has a light emitting diode enclosed by a material having a refractive index. In the particular example illustrated, light source array 232 is a four-by-four array. In other embodiments, array 232 may be larger or smaller.

As shown by FIG. 5, the volume or space between light sources 236 and optics 234 is filled with a second index matching material 259 having a second refractive index less than the first refractive index. As a result, any Fresnel losses (i.e., losses of light occurring at boundaries of different media having different refractive indices) are minimized. In one particular embodiment, light sources 236 constitute light emitting diodes having a refractive index greater than or equal to about 3.5 while material 259 has a refractive index of less than or equal to about 1.5. In one particular embodiment, material 259 constitutes plastic, oil or glass. In other embodiments, material 259 may constitute other materials or may be omitted.

Optics 234 collimate, collect, homogenize and re-scale or resize light from array 232 of light sources 236. Optics 234 generally includes array 260 of collimating lenses 266, array 262 of field lenses 268 and homogenizer/scaler 264. Array 260 constitutes a two-dimensional array of collimating lenses 266. In one embodiment, array 260 constitutes a four-by-four array of collimating lenses 266. In other embodiments, array 230 may be larger or smaller.

Array 260 of collimating lenses 266 receives light from array 232 of light sources 236. Each collimating lens 266 has a size and shape substantially equal to a size and shape of a corresponding one of light sources 236. In the particular example illustrated, each collimating lens 266 constitutes a refractive collimating lens. Examples of such refractive collimating lenses include lenses formed from high index plastic or glass and lenses that are spherical or aspherical. Because lenses 266 have a size and shape substantially equal to a corresponding one of light sources 236, and because lenses 266 are configured so as to be fully illuminated by a corresponding one of light sources 236, array 260 substantially collimates light independently from each of light sources 236 while minimizing or eliminating holes in the light that is further transmitted to array 262 of field lenses 268.

In the particular example illustrated, light from array 260 passes through index matching material 261 before reaching array 262. Index matching material 261 extends between arrays 260 and 262 and is transparent. Index matching material 261 has a refractive index similar to refractive index of material 259. As a result, material 261 minimizes Fresnel losses. In one embodiment, material 261 may constitute a transparent material having a refractive index of less than or equal to about 1.5. In one particular embodiment, material 261 may constitute plastic or low index glass. In other embodiments, other materials having other refractive indexes may be used or material 261 may be omitted.

Array 262 of field lenses 268 receives collimated light from array 260 and further collects such light while transmitting such light to homogenizer/scaler 234. In the particular embodiment illustrated, each lens 268 has a size and shape substantially equal to a corresponding one of light sources 236 as well as corresponding one of collimating lens 266. As a result, such light is transmitted without further gaps or holes in its spatial-angular distribution. In other embodiments, array 262 of field lenses 268 may be omitted.

Homogenizer/scaler 264 constitutes a device configured to homogenize and reduce or scale light from array 262. In the particular embodiment illustrated, homogenizer/scaler 264 constitutes a tapered light tunnel which reduces the spatial extent of the package while homogenizing such light.

Figure 6:
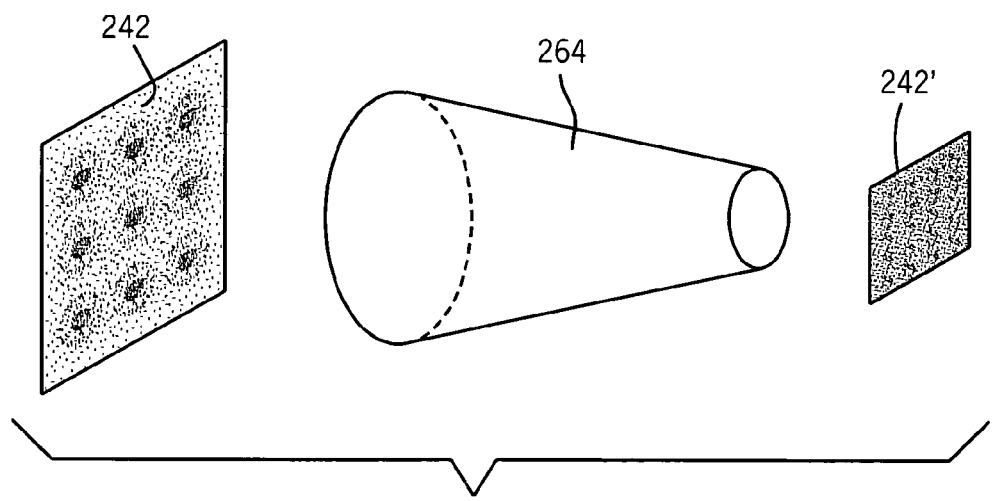
FIG. 6 is a top perspective view illustrating treatment of light by a homogenizer/scaler of the multiple light source system of FIG. 5 according to an example embodiment.

FIG. 6 illustrates treatment of light by homogenizer/scaler 264. In particular, as shown by FIG. 6, prior to entering homogenizer/scaler 264, light is non-uniformly spread across an area 242. Although the light in area 242 omits gaps or holes across area 242, such light has non-uniform spatial distribution. Homogenizer/scaler 264 scales the area 242 of light down to area 242'. As schematically represented by the substantially uniform density of dots across area 242', light across area 242' is homogenized so as to have a substantially uniform distribution or density across area 242'. The area 242' is sized for illuminating a destination such as a spatial light modulator with a small diameter sized illumination relay.

Figure 7:
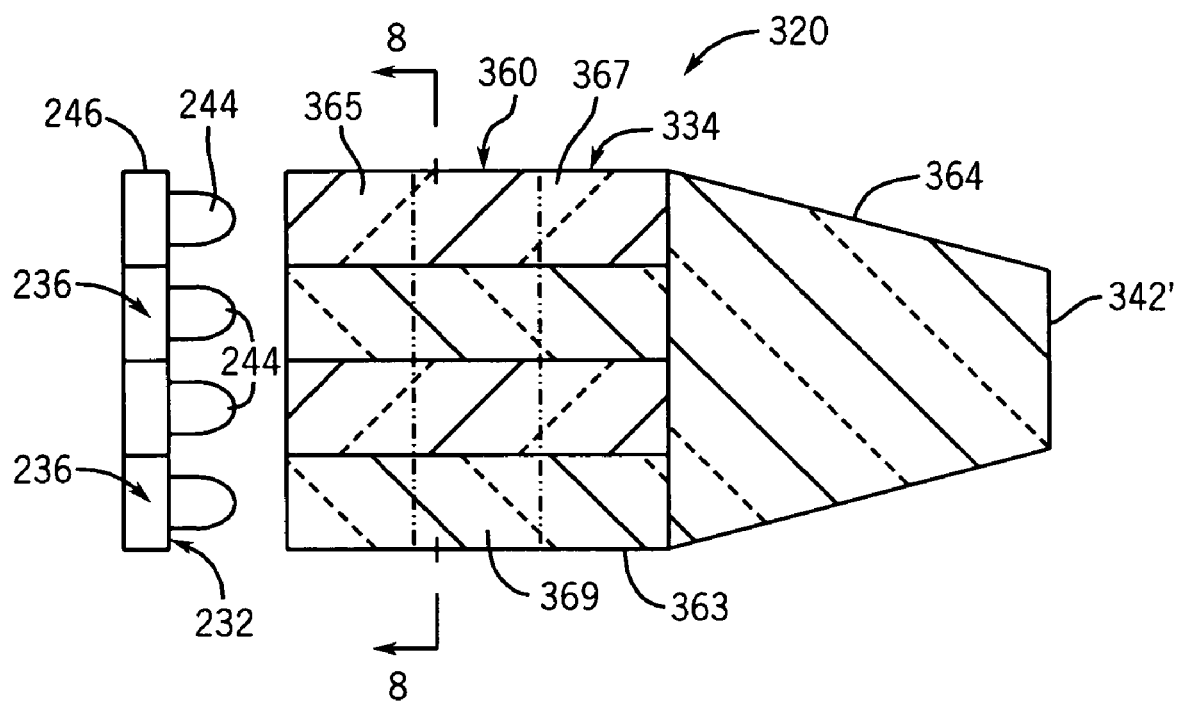
FIG. 7 is a sectional view of another embodiment of the multiple light source system of FIG. 2 according to an example embodiment.

FIG. 7 is a sectional view of multiple light source system 320, another embodiment of illumination system 20. System 320 is similar to illumination system 220 except that system 320 includes optics 334 in lieu of optics 234. Those remaining elements of system 320 which correspond to elements of system 220 are numbered similarly. Like optics 234, optics 334 collimates, collects and resizes light from array 232 of light sources 236. Optics 334 includes an array 360 of gradient refractive index (GRIN) rods 363 and a tapered light tunnel 364. Array 360 of rods 363 constitutes a four-by-four array of rods 363. In other embodiments, array 360 may be larger or smaller.

Array 360 of rods 363 collimates, captures and homogenizes light from array 232 of light sources 236. In one embodiment, each rod 363 includes a first gradient index material 365 configured to collimate light and a second gradient index material 367 configured to collect light, similar to a field lens. The collimating portion and the capturing portion of the rods 363 may be spaced by a transparent non-GRIN material 369 such as regular glass, plastic and the like. Each rod 363 transmits such collimated, captured and homogenized light to reducer 364.

Figure 8:
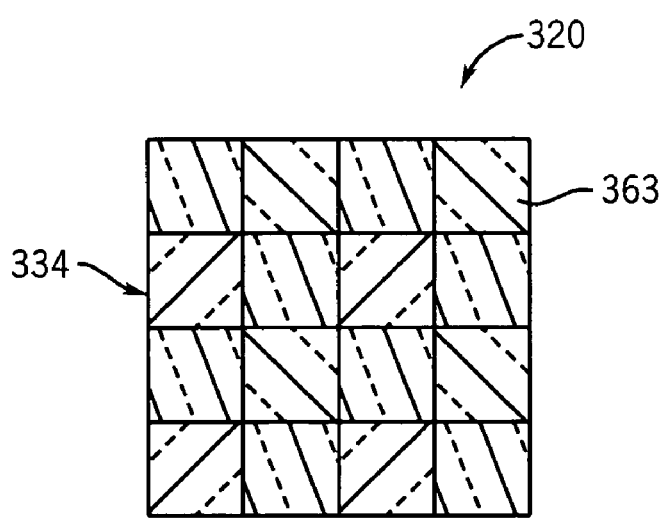
FIG. 8 is a sectional view of the multiple light source system of FIG. 7 taken along line 8-8 according to an example embodiment.

As shown by FIG. 8, in one particular embodiment, each rod 363 has a cross sectional area having a size and shape substantially equal to a size and shape of a corresponding one of sources 236 (shown in FIG. 7). As a result, gaps or apertures in the collimated light are eliminated or reduced.

As shown by FIG. 7, reducer 364 constitutes a device configured to reduce or scale the area of light from rods 363 to a desired usable size. In one embodiment, reducer 364 constitutes a tapered light tunnel. In other embodiments, reducer 364 constitutes other optical devices configured to reduce or scale the size of an area of light. The resulting light provided at the end of reducer 364 has a reduced area 342' that has a uniform distribution of average etendue of light sources 236 well suited for use in illuminating spatial light modulators. The area 342' is sized for illuminating a destination such as a spatial light modulator easily with a small diameter sized illumination relay.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
    emitting light from light sources, each light source having an average etendue, wherein the etendue of the light sources is distributed non-uniformly in the spatial-angular space over the first area;
    transmitting the light from the light sources through a first medium contained in a light source package and having a first refractive index;
    transmitting the light from the package to a collimating lens through a second medium having a second refractive index less than the first refractive index;
    transmitting the light from the collimating lens through a third medium having a third refractive index less than the second refractive index; and
    combining the etendue of the light sources into a second area smaller than the first area, wherein the etendue is substantially uniformly distributed in the spatial-angular space over the second area.

2. The method of claim 1 further comprising independently collimating light from the light sources with a two-dimensional array of collimating lenses.

3. The method of claim 2, wherein the lenses are refractive lenses.

4. The method of claim 2, wherein the light sources are provided by light source packages, wherein the collimation lenses each have a size and a shape substantially equal to a corresponding one of the packages.

5. The method of claim 4 further comprising collecting the light with a two-dimensional array of field lenses, each lens having a size and shape substantially equal to a corresponding one of the light source packages.

6. The method of claim 5 further comprising homogenizing the light from the array of field lenses.

7. The method of claim 6 further comprising scaling the homogenized light to the second area.

8. The method of claim 4 further comprising positioning the light source packages adjacent to one another without substantial intermediate gaps therebetween.

9. The method of claim 1 further comprising projecting the light onto a reflective light modulator.

10. The method of claim 9 further comprising projecting the light from the modulator onto a screen.

11. The method of claim 1, wherein the light sources are provided by light sources and wherein the light sources are different from one another.

12. An illumination system comprising:
    a two-dimensional array of light sources;
    an array of refractive collimation lenses, each lens having a size and shape substantially equal to a corresponding one of the light sources and arranged to independently collimate light from the corresponding light sources;
    a field lens array configured to be illuminated by collimated light from the collimating lenses; and
    a first transparent material between the light sources and the collimating lenses; and
    a second transparent material between the collimating lens and the field lens array, wherein the light sources have a first refractive index, wherein the first transparent material has a second refractive index less than the first refractive index and wherein the second transparent material has a third refractive index less than or equal the second refractive index.

13. The system of claim 12, wherein the lenses are positioned adjacent to one another without substantial gaps.

14. The system of claim 12 further comprising a light tunnel configured to homogenize light from the field lens array.

15. The system of claim 12, wherein the collimating lenses include gradient refractive index material.

16. The system of claim 12, wherein the light sources have different base structures.

17. The system of claim 12 further comprising a tapered integrating light tunnel.

18. An illumination system comprising:
a two-dimensional array of light sources;
an array of refractive collimation lenses, each lens having a size and shape substantially equal to a corresponding one of the light sources and arranged to independently collimate light from the corresponding light sources; and
a tapered integrating light tunnel, wherein the tunnel includes gradient refractive index material.

19. An illumination system comprising:
a two-dimensional array of light source packages;
an array of collimation lenses, each lens having a size and shape substantially equal to a corresponding one of the light sources and arranged to independently collimate light from the corresponding light source, wherein the collimatinci lenses include reflective mirrors;
an array of field lenses, each field lens having a size and shape substantially equal to a size and shape of a corresponding light source; and
an optical device configured to homogenize light received from the to array of field lenses.

20. The system of claim 19, wherein the light sources have different base structures.

21. The system of claim 19, wherein the optical device is configured to scale a size of light from the array of field lenses.

22. The system of claim 19, wherein the lenses are positioned adjacent to one another without substantial gaps therebetween.

* * * * *

UNITED STATES PATENT AND TRADEMARK OFFICE
CERTIFICATE OF CORRECTION

PATENT NO. : 7,310,186 B2 Page 1 of 1
APPLICATION NO. : 11/255473
DATED : December 18, 2007
INVENTOR(S) : Scott A. Lerner et al.

It is certified that error appears in the above-identified patent and that said Letters Patent is hereby corrected as shown below:

In column 8, line 62, in Claim 12, after "lenses;" delete "and".

In column 9, line 4, in Claim 12, after "equal" insert -- to --.

In column 10, line 8, in Claim 19, delete "collimatinci" and insert -- collimating --, therefor.

In column 10, line 13, in Claim 19, after "the" delete "to".

Signed and Sealed this

Eighth Day of July, 2008

JON W. DUDAS
*Director of the United States Patent and Trademark Office*